Patented Jan. 24, 1950

2,495,322

UNITED STATES PATENT OFFICE 2,495,322

PROCESS OF PRODUCING METAL NITRODITHIOACETATES

Everett E. Gilbert, New York, and Harold Weinberger, Brooklyn, N. Y., assignors to Allied Chemical & Dye Corporation, a corporation of New York No Drawing. Application October 26, 1946, Serial No. 706,048

5 Claims. (Cl. 260—429)

1

This invention relates to a process of producing metal nitrodithioacetates.

Among the objects of this invention is to provide an improved process of producing copper and zinc nitrodithioacetate, nitrodimethyldithioacetate or nitroethyldithioacetate in relatively high yield. Other objects and advantages of this invention will be apparent from the following description thereof. These compounds are useful in controlling fungi, particularly fungi infesting vegetation as disclosed in copending application Serial No. 706,049 filed as of even date herewith.

Copper and zinc nitrodithioacetates, i. e. copper and zinc salts of a compound having the following formula

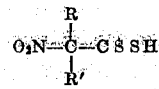

in which R is hydrogen or a methyl group and R' is hydrogen, a methyl or ethyl group, said compound containing not over 4 carbon atoms, are produced according to the present discovery by mixing nitromethane, nitroethane or the nitropropanes (1-nitropropane or 2-nitropropane) with carbon disulfide in an organic solvent, such as methanol, ethanol or isopropanol, reacting potassium hydroxide in an aqueous medium with the mixture and precipitating the desired copper or zinc salt by adding directly to the reaction mixture, a water soluble copper or zinc salt. Suitable water soluble copper and zinc salts are the sulfates, chlorides, acetates or nitrates of these metals.

It is important to carry out the reaction between the potassium hydroxide and the nitromethane or substituted nitromethanes and carbon disulfide in an aqueous medium; the use of such medium has been found to result in an increase in the yield of the desired metal salt as compared with the yield resulting when the reaction is carried out in the presence of an organic solvent and in the absence of water. Furthermore, it is important to add the water soluble copper or zinc salt directly to the reaction mixture without isolating the potassium nitrodithioacetate or substituted nitrodithioacetates from this mixture; the addition of the zinc or copper salt directly to the reaction mixture has been found to result in a substantial improvement in the yield. The temperature of the reaction mixture during the precipitation of the desired copper or zinc salt is preferably room temperature, i. e. about 25° C.

The amounts of reactants used in this process

2 are not critical, provided enough of each of the reactants is employed to insure substantially complete reaction with the other reactants to produce the desired products. The reaction is desirably carried out at room temperature (about 25° C.) and at atmospheric pressure.

The following example is illustrative of the process of this invention; it will be understood the invention is not limited to this example. Amounts are given in parts by weight.

30 parts of nitromethane and 45 parts of carbon disulfide were dissolved in 80 parts of methanol. 60 parts of potassium hydroxide in a 30% by weight water solution were added slowly over a period of 30 minutes to the reaction mixture while stirring; the reaction mixture was cooled to maintain the temperature at not above 20° C. After the reaction mixture stood for 30 minutes, 90 parts of zinc sulfate in a 20% by weight water solution were added thereto while stirring over a period of 30 minutes, the temperature of the reaction mixture being room temperature. The stirring of the reaction mixture was continued for about 30 minutes after the addition of the zinc sulfate had been completed. The reaction mixture was then filtered to separate the precipitated zinc nitrodithioacetate which was then washed with methanol, followed by an ether wash, and thereafter dried under vacuum at room temperature. A yield of 68% of theoretical was thus obtained.

By substituting copper sulfate for the zinc sulfate in the above example, copper nitrodithioacetate was produced.

By using nitroethane, 1-nitropropane or 2-nitropropane instead of the nitromethane in the above example the zinc nitromethyldithioacetate, nitroethyldithioacetate or nitrodimethyldithioacetate, respectively, may be produced; the copper salt of nitromethyldithioacetic acid, nitroethyldithioacetic acid or nitrodimethyldithioacetic acid may be produced by employing water soluble copper salts, instead of zinc sulfate to precipitate the desired substituted nitrodithioacetate.

It is intended that all matter contained in the above description shall be interpreted as illustrative and not in a limiting sense.

What is claimed is:

1. A process for producing metal nitrodithioacetates, said metal being from the group consisting of copper and zinc and said nitrodithioacetates being from the group consisting of nitrodithioacetate, nitromethyldithioacetate, nitrodimethyldithioacetate and nitroethyldithioacetate, which process comprises mixing a nitrohydrocarbon of the group consisting of nitromethane, nitroethane, 1-nitropropane and 2-nitropropane with carbon disulfide in an aliphatic alcohol containing not more than 3 carbon atoms, reacting the resultant mixture with potassium hydroxide in an aqueous medium and adding directly to the reaction mixture a water soluble salt of said metal to precipitate the desired metal salt.

2. A process of producing a metal salt of the group of metals consisting of copper and zinc of a compound having the formula

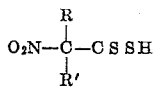

in which R is a member of the group consisting of hydrogen and a methyl group and R' is a member of the group consisting of hydrogen, methyl and ethyl groups, said compound containing not over 4 carbon atoms, which process comprises mixing a nitrohydrocarbon of the group consisting of nitromethane, nitroethane, 1-nitropropane and 2-nitropropane with carbon disulfide in an aliphatic alcohol containing not more than 3 carbon atoms, adding aqueous potassium hydroxide to the resultant mixture at a temperature of about 25° C., and precipitating the said metal salt by adding directly to the reaction mixture a water soluble salt of said metal selected from the group consisting of sulfates, chlorides, acetates, and nitrates thereof.

3. A process of producing metal nitrodithioacetates, said metal being from the group consisting of copper and zinc and the nitrodithioacetates being from the group consisting of nitrodithioacetate, nitromethyldithioacetate, nitrodimethyldithioacetate and nitroethyldithioacetate, which comprises mixing a nitrohydrocarbon of the group consisting of nitromethane, nitroethane, 1-nitropropane and 2-nitropropane with carbon disulfide in a methanol medium, reacting the resultant mixture with potassium hydroxide in an aqueous medium while maintaining the temperature of said reaction mixture at a temperature of about 25° C., and adding directly to the reaction mixture a water soluble salt of said metal selected from the group consisting of sulfates, chlorides, acetates, and nitrates thereof to precipitate the desired metal salt.

4. A process of producing zinc nitrodithioacetate which comprises mixing nitromethane with carbon disulfide in an aliphatic alcohol containing not more than 3 carbon atoms, adding aqueous potassium hydroxide to this mixture while maintaining the temperature thereof at about 25° C., and precipitating zinc nitrodithioacetate by adding zinc sulfate directly to the reaction mixture.

5. A process of producing copper nitrodithioacetate which comprises mixing nitromethane with carbon disulfide in an aliphatic alcohol containing not more than 3 carbon atoms, adding aqueous potassium hydroxide to this mixture while maintaining the temperature thereof at about 25° C., and precipitating copper nitrodithioacetate by adding copper sulfate directly to the reaction mixture.

EVERETT E. GILBERT.
HAROLD WEINBERGER.

REFERENCES CITED

The following references are of record in the file of this patent:

UNITED STATES PATENTS

| Number | Name | Date |
| --- | --- | --- |
| 2,229,562 | Gracia | Jan. 21, 1941 |
| 2,286,738 | Hill | June 16, 1942 |

OTHER REFERENCES

Freund: "Ber. Deutsch. Chem. Ges.," vol. 52, pages 542–544 (1919).